United States Patent [19]
Antoni et al.

[11] Patent Number: 4,916,714
[45] Date of Patent: Apr. 10, 1990

[54] MOVABLE GRAPHITIZING FURNACE

[76] Inventors: Franco Antoni, Via Alamanni 18, 20141 Milano; Lohengrin Celani, Via delle Campanule 3, 63100 Ascoli Piceno; Emidio Di Fabio, Via dei Tigli, 6-4, 20020 Arese; Jean L. Genevois, Corso Sempione 3, 20145 Milano, all of Italy

[21] Appl. No.: 286,953
[22] PCT Filed: Apr. 29, 1987
[86] PCT No.: PCT/IT87/00039
§ 371 Date: Oct. 24, 1988
§ 102(e) Date: Oct. 24, 1988
[87] PCT Pub. No.: WO87/06685
PCT Pub. Date: Nov. 5, 1987

[30] Foreign Application Priority Data
Nov. 30, 1986 [IT] Italy ................... 47968 A/86

[51] Int. Cl.⁴ ............................................. H05B 3/60
[52] U.S. Cl. ................................... 373/120; 373/122; 373/125
[58] Field of Search .............. 373/120, 122, 125, 126

[56] References Cited
U.S. PATENT DOCUMENTS

Re. 27,018  1/1971  Bolkcom et al. .
1,684,611   9/1928  White .
3,976,829   8/1976  Wiebke et al. ............... 373/120
3,989,883  11/1976  Wiebke et al. ............... 373/120
4,015,068   3/1977  Vohler ......................... 373/120
4,017,673   4/1977  Michels et al. .
4,049,900   9/1977  Genevois et al. .
4,394,766   7/1983  Karagoz ....................... 373/120
4,639,929   1/1987  Bernard et al. .
4,730,339   3/1988  Corato et al. ................. 373/120

FOREIGN PATENT DOCUMENTS
342101   8/1904  France .
1494390 12/1977  United Kingdom .

Primary Examiner—Roy N. Envall, Jr.
Attorney, Agent, or Firm—DeLio & Associates

[57] ABSTRACT

A moveable graphitizing furnace to graphitize several columns of electrodes at the same time in two side by side tanks. The furnace has a metallic cage construction and a covering of firebricks arranged at sight on said cage construction and self-compensating the thermic expansion and the thrust exerted from outside on each column of electrodes to be graphitized. The furnace is further provided with screens protecting the framework and the wheels from heat, air forced cooling system to cool the bottom of the tanks, as well as water circulation cooling system to cool the bus bar electrodes also during the movement of the furnace after the graphitizing process.

12 Claims, 6 Drawing Sheets

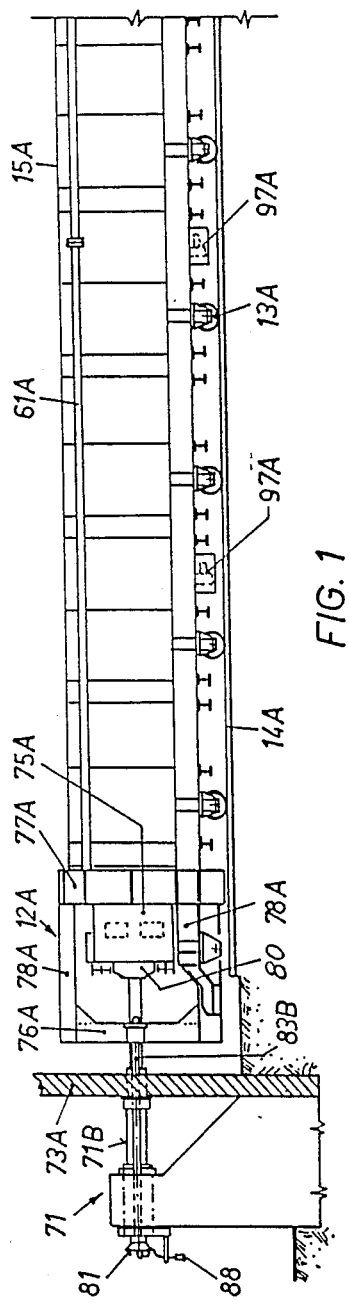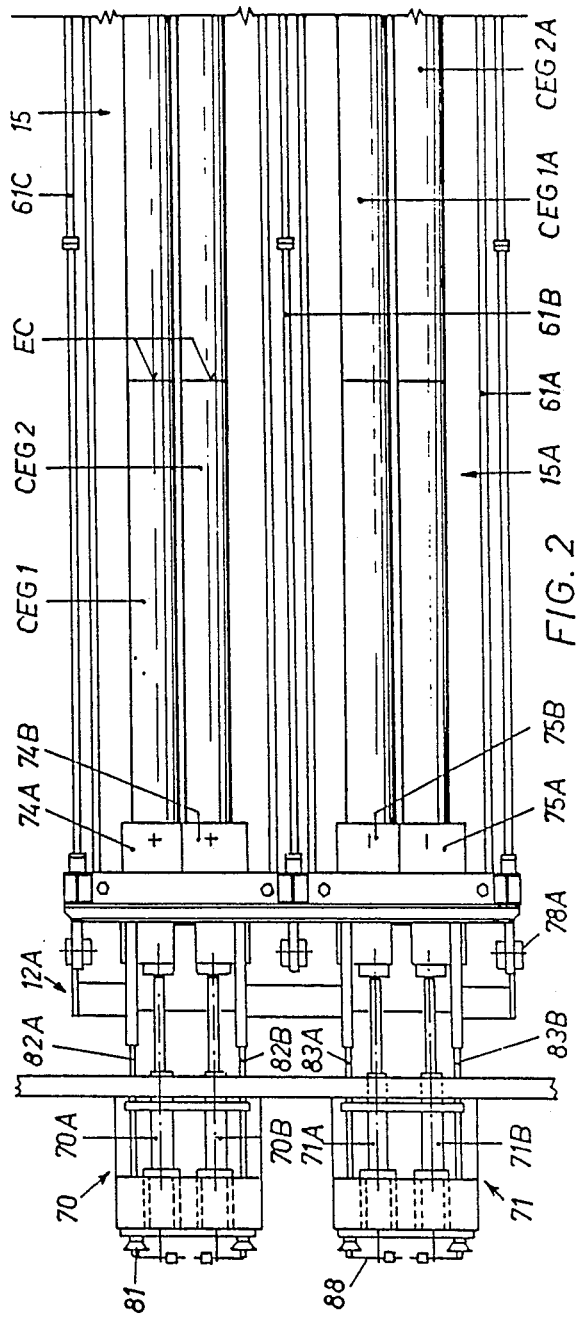

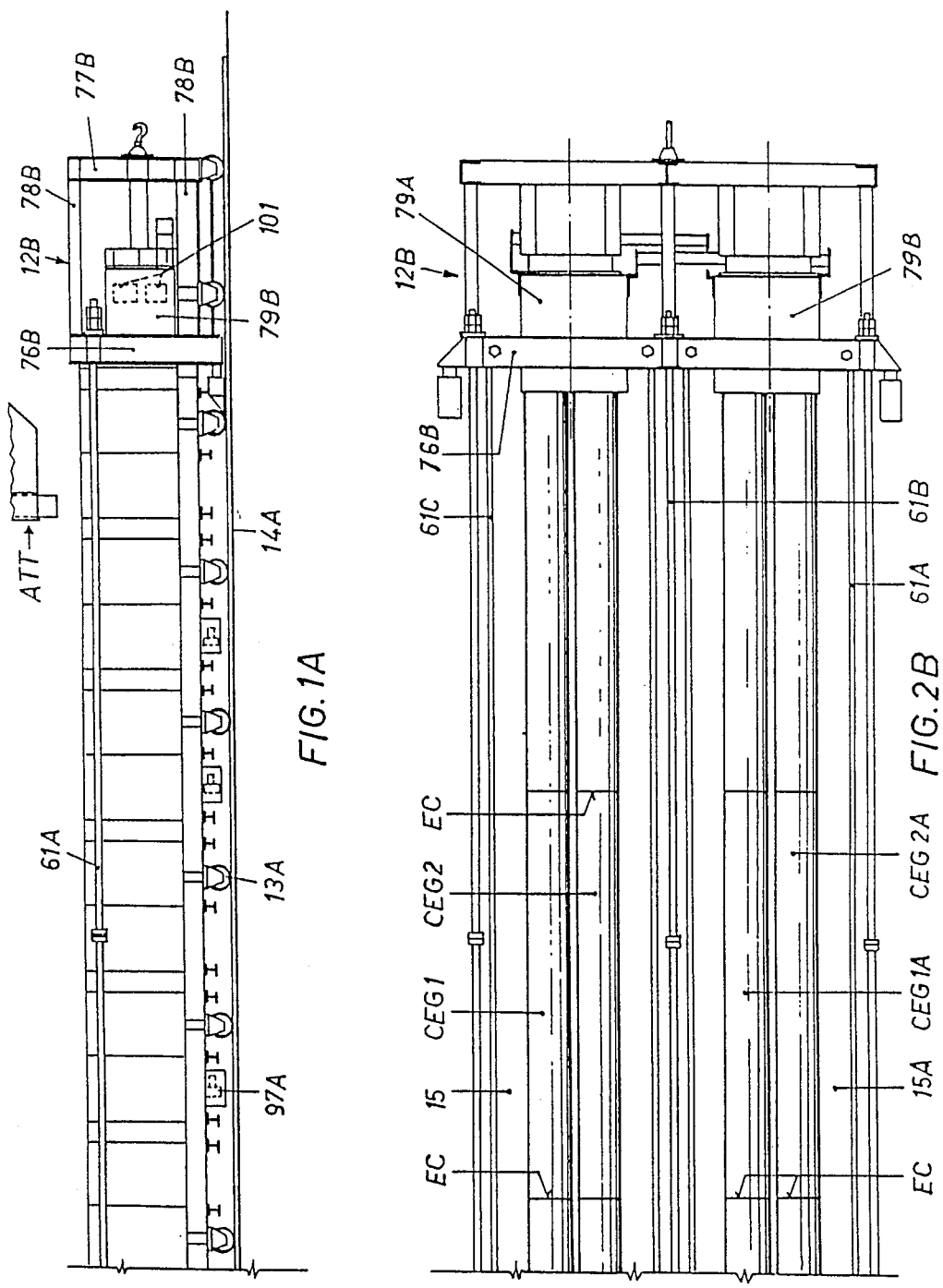

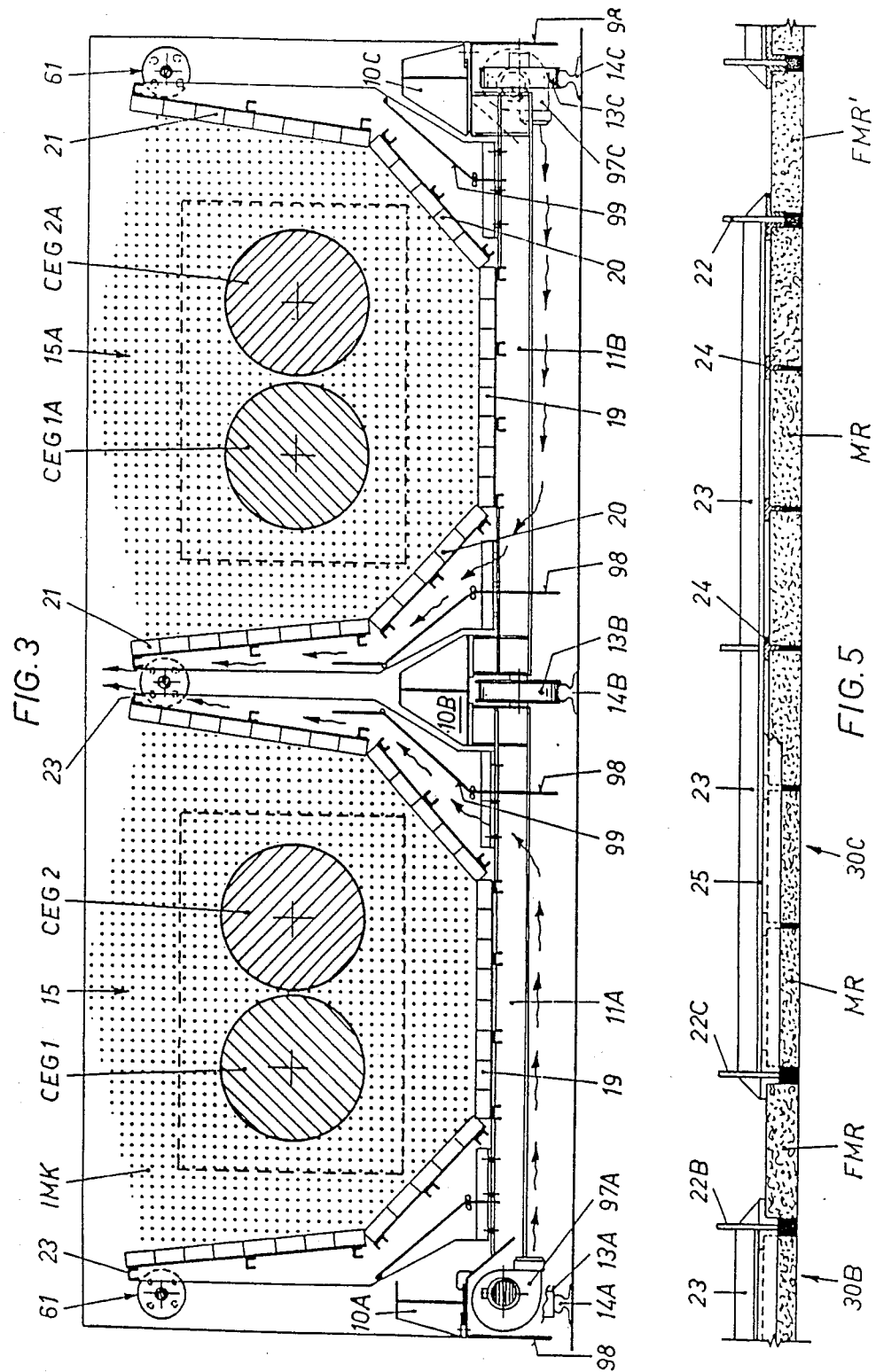

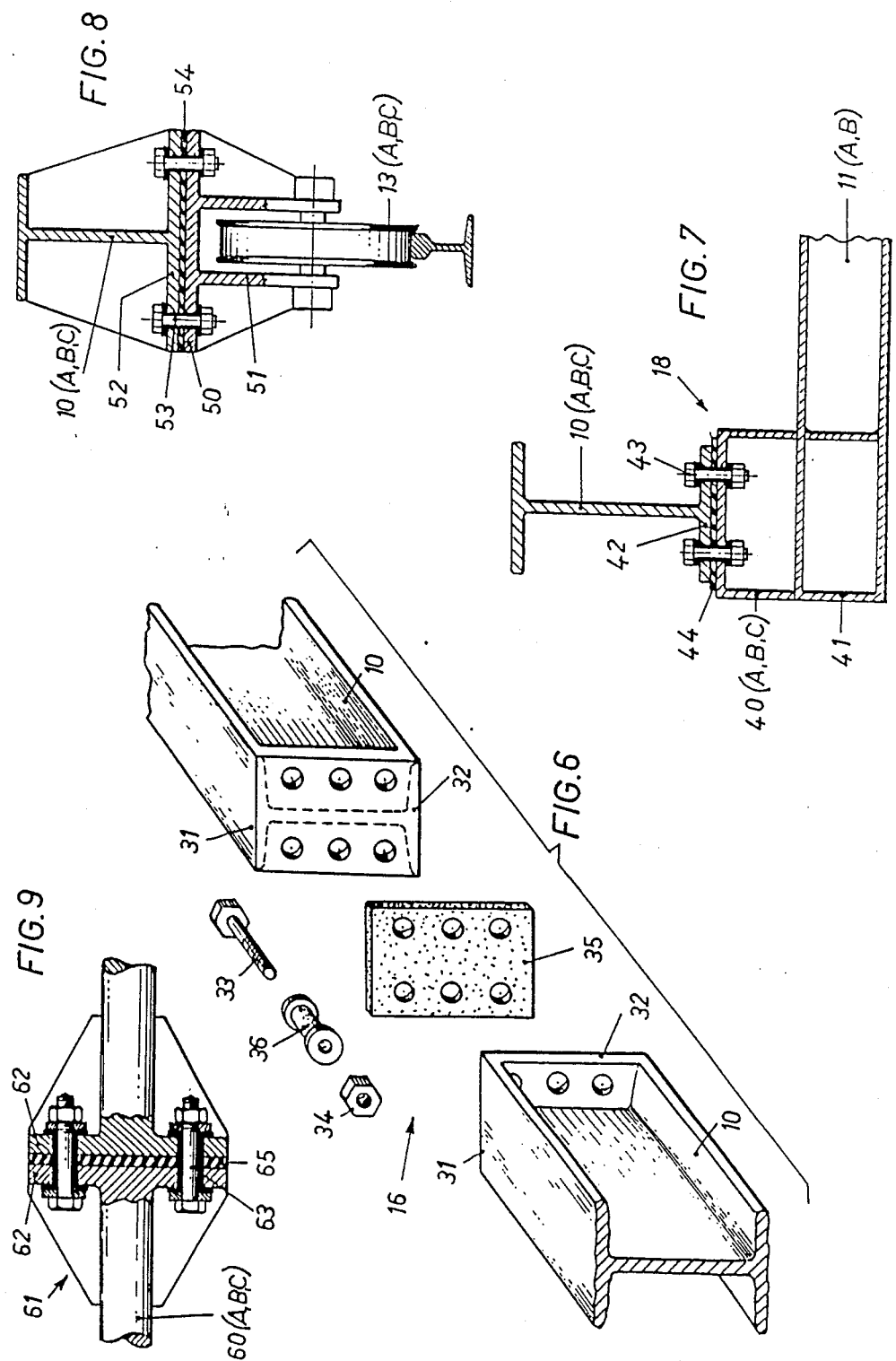

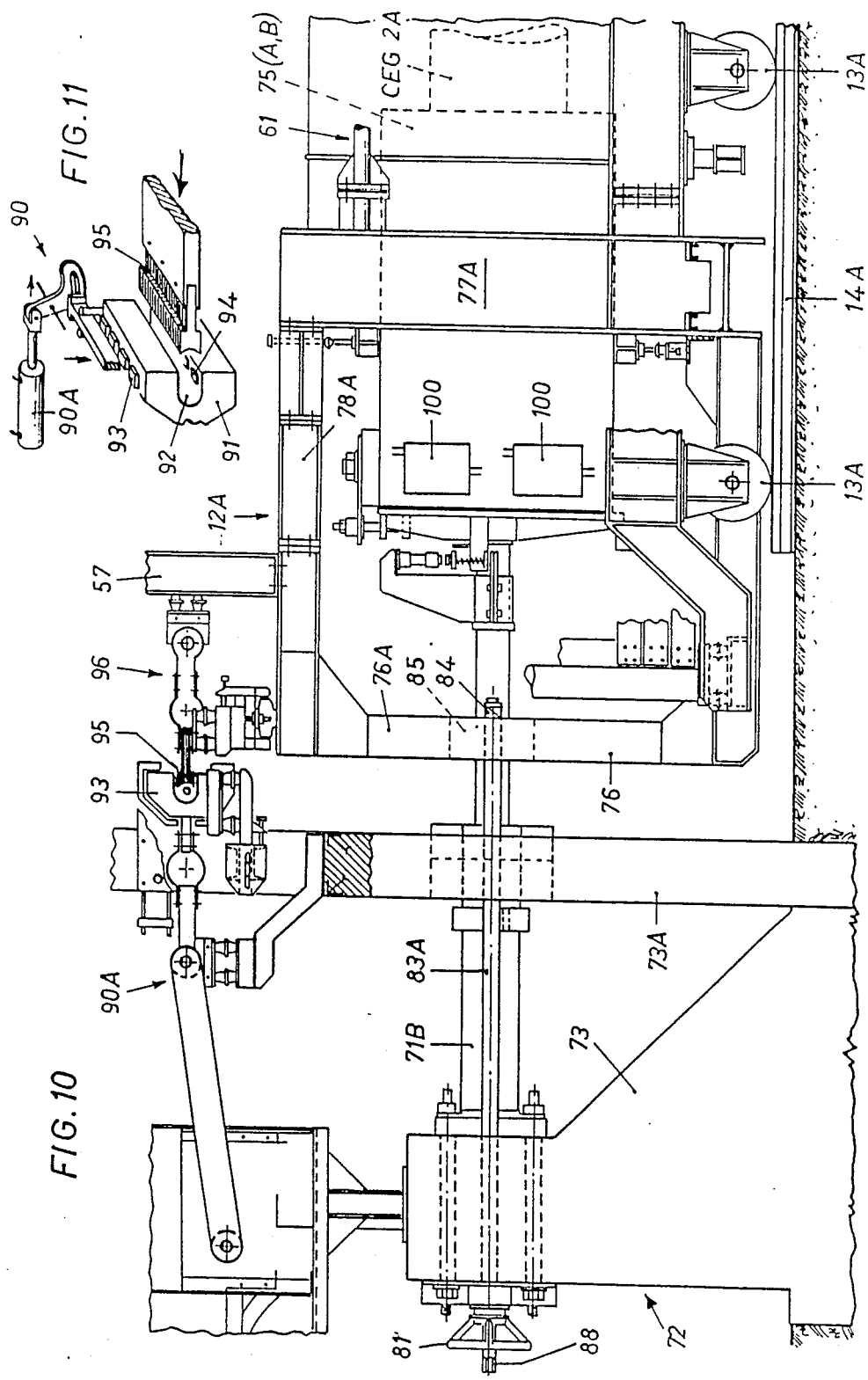

MOVABLE GRAPHITIZING FURNACE

This invention relates to an improvement in moveable graphitizing furnaces.

As is well-known, electrodes for arc furnaces are used in ferrous metallurgy and are produced by baking, impregnating and annealing carbon materials. Such electrodes are subjected to a graphitizing process in which a D.C. or alternate current at a very high intensity and a comparatively low voltage, i.e. about 160,000 to 200,000 A and 110 to 220 V, is passed through the electrodes. The current flow causes a very high heating of the electrodes, which reach temperatures on the order of 2,300° C. to 3,000° C., whereupon the structure of the carbon passes from amorphous to crystalline, i.e. the carbon becomes graphite.

The graphitizing process has long been carried out by so-called Acheson furnaces in which the current flows crosswise to the axis of the electrodes. Only in recent times have said furnaces been replaced by graphitizing furnaces in which current is passed along the axis of the electrodes according to the so-called longitudinal graphitizing process in which several electrodes to be graphitized are placed aligned in columns between two poles of graphite. Pressure is exerted on such poles in order to keep ends of electrodes to be graphitized in contact with one another and with the poles. The pressure exerted on the poles has to be steady and elastic in order to keep the contact between the ends of the electrodes during any shrinkage or expansion of the electrode columns during the heating process.

In such furnaces the column of electrodes to be graphitized acts as a conductor through which a current is passed. The column is placed horizontally within a mass of granules of metallurgical or petroleum coke which comprise a bed on which the electrode column rests and a covering above the latter so that the electrodes are "included" or enveloped in said stuffing mass. Complex technical and technological problems develop with such a graphitizing process, in which a current is being passed along the axial direction of the furnaces, because of the provision of the stuffing mass acting as a thermal insulation, and the necessity to avoid keeping the cumbersome, heavy, expensive mechanical and electrical equipment idle during the cooling time. The solutions of these problems are the objects of a number of patents concerning movable graphitizing furnaces provided with wheels such as U.S. Pat. Nos. 1,029,121 to Heroult (class 13/7) and 4,015,068 of Vohler (class 13/7), German Pat. Nos. P2018764.8 and P2316494.5 of Sigri Electrographit GmbH, and U.S. Pat. No. 4,394,766, filed in the PCT as No. PCT/US82/01046, of Great Lakes Carbon Corporation.

The latter patent, although it introduces advanced solutions, does not solve some problems associated with substantial drawbacks. Among other things, it should be noted that the arrangement, transport and filling of the stuffing mass of coke under, about and over the electrodes to be graphitized, as well as the use of a tank formed of an outer, continuous shell of steel with a lining, provides a construction that, besides being very heavy, gives rise to serious problems of thermal expansion.

In addition to such problems, the solution proposed by Great Lakes Carbon Corporation has also the drawback of rendering useless a great number of electrode pressing systems as each furnace is provided with its own self-contained system. Finally, only one column of electrodes at a time can be graphitized by the furnace of Great Lakes.

This invention seeks t avoid the drawbacks of the prior art by providing a highly improved graphitizing furnace which is comparatively light, is provided with equipment of very quick operation for the arrangement, removal and rearrangement of the stuffing mass of coke, and in which the power dispersion in the environment is reduced to a minimum. The furnace has an outer pressing system to which it is quickly connected only during the step in which a current is passed through the electrodes so that such pressing system may be connected to other furnaces during the long cooling time of each furnace. The furnace of this invention allows two or more electrode columns at a time to be graphitized.

Furthermore the graphitizing furnace of this invention also provides completely new solutions such as forced air cooling of the tank bottom, screens protecting the frame and wheels from heat, and water circulation cooling of the bus bar heads during the movement of the furnace after the graphitizing process.

The furnace according to this invention essentially provides: a support framework, two side by side tanks containing the columns of electrodes to be graphitized and the relative stuffing mass of coke, each consisting of a steel cage construction carrying the firebricks and pressure compensating members; an outer, stationary framework carrying members designed to transmit the required thrust to the electrodes to be graphitized, the bus bars along with their connections, the means fastening the furnace to the pressing system; the outer equipment for filling, removing and refilling from the top the stuffing mass of coke; a forced air system for cooling the frame and the bottom of the tanks; screens protecting frame and wheels from heat; and a water circulation cooling system for the bus bar heads during the movement of the furnace.

The movable graphitizing furnace of this invention will be described herebelow in detail with reference to the accompanying drawing, in which:

FIGS. 1 and 1A show a side elevation of a movable furnace with relative stationary pressing framework;

FIGS. 2 and 2B show a top view of the movable furnace and the stationary framework;

FIG. 3 is a cross-section, in enlarged scale, of the movable furnace;

FIG. 5 is a section showing in enlarged scale the section of the tank edge;

FIG. 6 is a detailed exploded view showing in more enlarged scale an electrically insulated connection between longitudinal members of the furnace support framework;

FIG. 7 shows the detail of the electrically insulated connection between cross members and longitudinal members;

FIG. 8 shows the detail of the connection of a wheel fork to a longitudinal member;

FIG. 9 is a similar view of an electrically insulated connection between upper tie rods;

FIG. 10 is a sectioned elevation showing in enlarged scale the stationary framework and the end of the movable graphitizing furnace;

FIG. 11 shows the detail of the stationary bus bar clamping system integral with the framework and movable together with the furnace;

Figure 4:
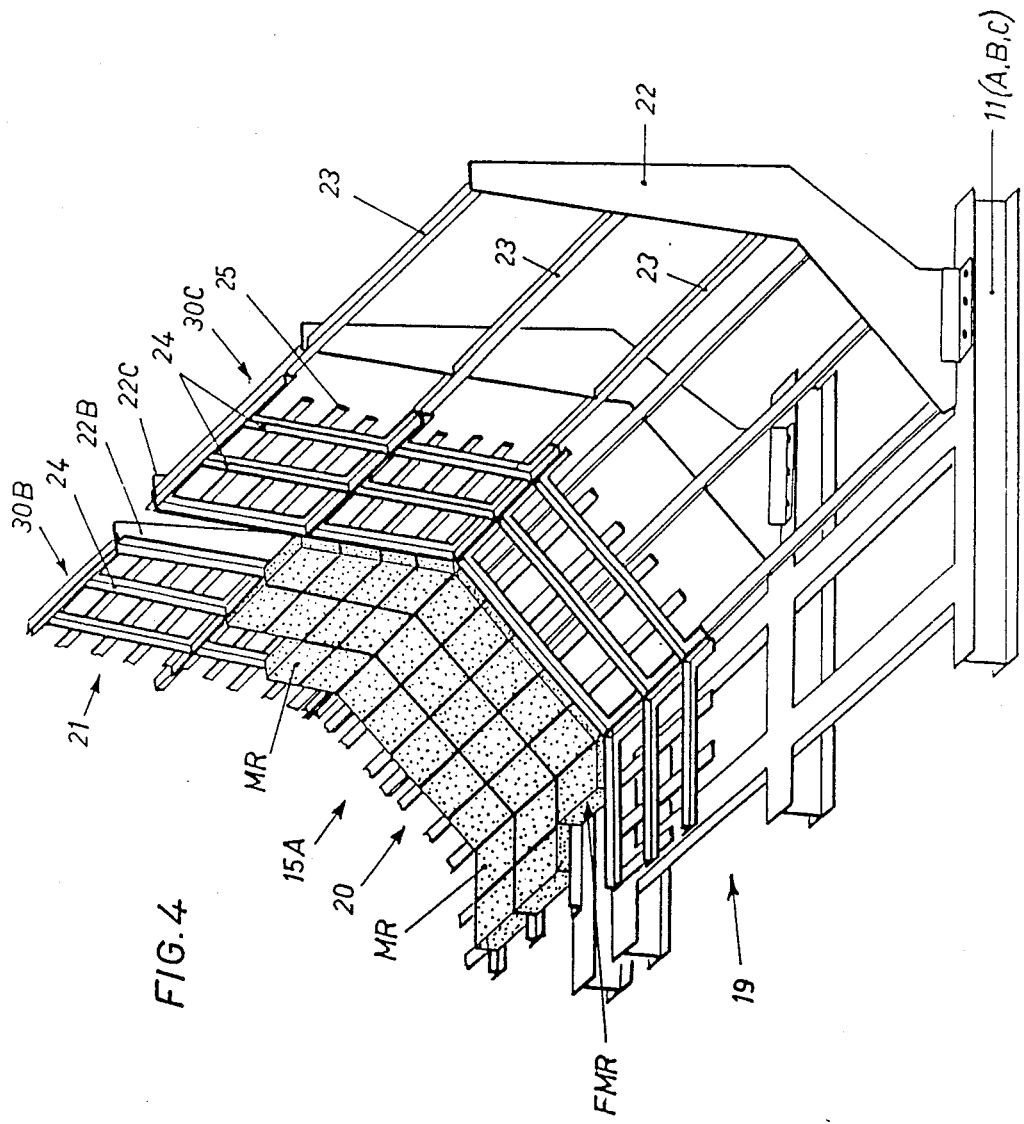
FIG. 4 is a perspective view showing in even more enlarged scale a detailed portion of the construction of a member of the tank cage.

The mechanical construction of the movable furnace of this invention will be described with reference to FIGS. 1 to 9. Such construction comprises a support framework formed of three longitudinal members designated by 10A, 10B, 10C, each consisting of several members insulated from one another, two sets of cross members generally designated by 11A and 11B, and two end frameworks designated by 12A and 12B, respectively. Longitudinal members 10A, 10B, 10C support several wheels designated by 13A, 13B, and 13C running on respective rails 14A, 14B, 14C.

A first graphitizing tank of the furnace, generally designated by 15, is supported by the cradle formed by both longitudinal members 10A and 10B and cross members 11A. A second graphitizing tank 15A (FIG. 3) is supported by a second cradle placed side by side to the first cradle and formed by both longitudinal members 10B and 10C and cross members 11B.

As known by those skilled in the art, both tanks cannot have an electrical connection so as not to give a preferential path to the electrical current which has to flow through the columns of electrodes to be graphitized. The mechanical connection of longitudinal members 10A, 10B, and 10C is interrupted by electrically insulated joints generally designated by 16 (better seen in FIG. 6), and cross members 11A and 11B are connected at their ends to the respective longitudinal members by electrically insulated joints generally designated by 18 (better seen in FIG. 7). As both tanks 15, 15A have identical construction, only one of them will be described in particular with reference to the perspective view of FIG. 4.

First of all, both tanks 15, 15A cannot have electrical connection either, so that their electrically conductive members, such as the metallic steel cages, cannot have metallic connection. Consequently, as shown in FIG. 4, the metallic cage of each tank consists of several lengths separated and electrically insulated from one another.

As clearly apparent, tank 15 (and the identical tank 15A as well), shown partially in the fragmentary perspective view of FIG. 4, has a U-shaped cross-section and is formed of traverses providing a horizontal bottom 19, two slightly inclined sides 20, and two almost vertical sides 21. The inner section of tanks 15, 15A has the shape of the transverse frames 22 which form the cross members of the cage. The main longitudinal members of the cage are formed of horizontal stringers 23 suitably arranged at different heights along transverse frames 22. The framing of each cage is designed to support the arrangement of bricks forming the tank and will be described in particular with reference to the fragmentary view of FIG. 4.

Two adjoining sectors among the several aligned and separated sectors forming each cage are fragmentarily shown in FIG. 4. As far as the metallic continuity of the cage is concerned, such sectors are separated and electrically insulated, as better illustrated afterwards, by suitable joints arranged between members which cannot be mechanically separated from each other like, for example, the longitudinal members. In FIG. 4, two adjoining sectors 30B and 30C are shown, each consisting of three contiguous transverse frames connected by horizontal stringers 23 (see also FIG. 5). As clearly illustrated, the mechanical continuity of the framing is also interrupted because the horizontal flat bar irons 25 extend only along the length defined by three transverse frames 22. It follows that between adjoining transverse frames 22B of sector 30B and transverse frames 22C of sector 30C there is a mechanical interruption in the horizontal members of the cage.

As shown in FIG. 5, bars 24 consist of side by side T-bars forming a set of channels on which firebricks MR are placed abutting on stringers 23. The mechanical continuity of the firebrick wall at the cut points between sectors is provided by bringing the adjoining end transverse frames of each sector closer so that the respective vertical T-bars are at a distance equal to the length of a firebrick MR. As clearly shown in FIGS. 4 and 5, adjoining sectors 30B and 30C are electrically insulated from each other because of the separation among stringers 23 and horizontal flat bar irons 25. However, the continuity of the firebrick wall is assured by the row of firebricks designated by FMR covering the space between adjoining transverse frames of both sectors.

Since longitudinal members 10A, 10B, and 10C cannot have mechanical continuity either, as already mentioned, each of them is formed of several double T-bars connected by electrically insulated butt joints equal to one another such as shown in the fragmentary view of FIG. 6, said joints being designated by 6 and associated to any longitudinal members generally designated by 10. A rectangular plate 32 provided with two rows of holes is welded at the end 31 of each double T-bar, and the butt joints between both plates 32 is provided by a bolt and a nut designated by 33 and 34, respectively. To interrupt the electrical continuity between the two T-bars, a flat rectangular, bored plate 35 of an electrically insulating material is arranged between plates 32. As the bolts should be insulated as well, they are provided with a sleeve having the form of a cylinder with two washers of insulating material designated by 36 in FIG. 6.

It is self-evident that cross members 11(A, B) and box-like members 40(A, B, C) supporting wheels 13(A, B, C) should also be connected to respective longitudinal members 10(A, B, C) by electrically insulated joints in order to avoid a short circuit between both tanks 15, 15A along cross members 11(A, B) and to prevent current discharges on rails 14 (A, B, C). To this end, essentially the same electrical insulation system as that described before to connect longitudinal members 10 (A, B, C) will be used, i.e., a system in which flat steel plates are connected by bolts provided with an electrically insulating sleeve and washers, and a flat plate of electrically insulating material arranged therebetween. Such connection system between the end of any cross member 11(A, B) and the lower flange of respective longitudinal member 10 (A, B, C) is generally designated by 18 (FIG. 7), wherein a flat insulating plate 44 is arranged between the upper flange of box-like member 40 at end 41 of cross member 11 (A, B) and the lower flange 42 of longitudinal member 10(A, B, C), which are connected by bolts 43 provided with respective nuts and insulating sleeves.

The connection between upper plate 50 of fork 51 carrying wheels 13(A, B, C) and the widened portion 52 of the lower flange of longitudinal member 10 (A, B, C) is quite similar. As seen in FIG. 8, a flat plate 54 of an electrically insulating material is arranged between plate 50 and widened portion 52 which are connected to each other by bolts 53 provided with insulating sleeves.

As the pressure exerted by the hydraulic pressing assemblies tends to move end frameworks 12A, 12B away, as better described afterwards, the latter are connected by three steel tie rods 60 (A, B, C) having a circular section, as shown in FIG. 9. In order to interrupt the electrical continuity, such tie rods are connected by electrically insulated joints designated by 61 and formed of circular flanges 62 provided with four holes and connected by four bolts 63 with electrically insulating sleeves and washers. A circular plate 65 of electrically insulating material is arranged between said flanges.

One of the end frameworks designated by 12A, i.e. that subjected to the pressure of hydraulic pressing assemblies designated by 70 and 71 and supported by the stationary framework 72, is shown in detail in FIG. 10.

As illustrated, the stationary framework 72 is formed of an assembly of reinforced concrete firmly anchored to the ground and designated by 73, and of a rectangular frame 73A. Two columns of electrodes in each tank are graphitized at the same time in this embodiment of the invention, as already mentioned. Each hydraulic pressing assembly consists of two double hydraulic cylinder and piston assemblies, which are designated as 70A, 70B and 71A, 71B, respectively, since the thermal expansions of each column of electrodes are different in magnitude and sign and require different compensations. For this reason also the graphite poles are doubled and carry the numerals 74A, 74B and 75A, 75B, respectively, depending on which hydraulic cylinder and piston assembly 70A, 70B and 71A, 71B, respectively, act thereon, as shown in FIG. 2.

Graphite poles 74A, 74B and 75A, 75B are carried by end framework 12A of the movable furnace so as to horizontally traverse when the ends of hydraulic cylinder and piston assemblies 70A, 70B and 71A, 71B act on the outer surface thereof, thus forming a single assembly when the furnace is anchored to stationary framework 72.

The other end framework 12B has a construction similar to end framework 12A as it has an inner frame 76B and an outer frame 77B connected by longitudinal members 78B. Two stationary heads 79A and 79B consisting of graphite blocks are supported by framework 12B. The graphite blocks are connected to bus bars which electrically connect the columns of electrodes to be graphitized, CEG1 and CEG2 contained in tank 15, and CEG1A and CEG2A contained in adjoining tank 15A. By such an arrangement the graphitizing current will flow, of course, from graphite electrodes 74A, 74B to both columns of electrodes CEG1, CEG2, common heads 79A, 79B, columns of electrodes to be graphitized CEG1A and CEG2A, and finally to the other pair of electrodes 75A, 75B, thus making the electrical circuit (FIGS. 1A, 2B).

As the pressure exerted by the hydraulic assemblies would tend to move the furnace (movable on wheels) away from the stationary framework 72, framework 72 and the end uprights 76A of framework 12A of the movable furnace are secured by anchoring means formed of four tie rods 82A, 82B and 83A, 83B which are integral with the upper portion of stationary framework 73. The rods include hammer heads 84 which are inserted into vertically elongated slots 85 provided in the end uprights 76A and are fastened when the heads are rotated by 90° so as to be oriented in the horizontal plane. A simple threaded rod and handwheel assembly 81 allows tie rods 82A, 82B and 83A, 83B to be put under tension.

The hydraulic control device generally designated by 90 is also shown in the fragmentary, perspective view of FIG. 11. The hydraulic control device is arranged partially on the rectangular stationary framework 73A and partially on framework 12A of the movable furnace having the function of connecting bus bar electrodes 74A, 74B and 75A, 75B to the system supplying the graphitizing current. The stationary part consists of an elongated member 91 having a forward U-shaped groove 92, the rectilinear portions of which are provided with rectangular side by side openings, in which several upper contact blocks 93 and several lower contact blocks 94 slide. The set of blocks 93 and 94 can be switched from an open position such as that indicated in FIG. 11, in which the inner ends of such blocks are outside the groove 92, to a closed position, in which such ends are inside the same groove, by means of a well-known hydraulic control means generally designated by 90A. Groove 92 can receive end 95 of a stationary bus bar integral with a contact assembly 96 placed above the horizontal member 78A and supported by a vertical member 97. Assembly 96 of bus bars annexed elements is well known and will not be illustrated in detail since it has only the function of electrically connecting the pairs of movable electrodes 74A, 74B and 75A, 75B to the power supply system supplying the graphitizing current.

As illustrated in the sectioned view of FIG. 3, bottom 19 of tanks 15 and 15A and the lower frame of the furnace are cooled by an air current which is produced by fans 97A, 97C secured under longitudinal members 10A, 10C and which is appropriately deflected by vertical baffles 98 arranged under longitudinal members 10A, 10B, 10C. Furthermore, sheet screens 99 are placed along the lower wall of tanks 15, 15A in order to protect from heat the wheels 13A, 13B, 13C and the members of the lower framework of the furnace.

Another feature of the furnace of this invention is that of water circulation for cooling the graphite electrodes 74A, 74B and 75A, 75B and the graphite heads 79A, 79B also during the movement of the furnace. Water circulation is carried out in the hollow plates 100 placed on the surfaces of electrodes 74A, 74B and 75A, 75B (FIG. 10) and in the hollow plates 101 placed on the surfaces of heads 79A, 79B (FIG. 1A). Water is conveyed to such plates by hoses (not shown) connected to fittings provided on the plates themselves.

The construction of the furnace according to this invention allows the operations of filling, removing and refilling the stuffing mass of coke IMK (fragmentarily shown in the sectioned view of FIG. 3) to be carried out from the top of the furnace by means of a pneumatic apparatus having telescopic pipes and carried by a bridge crane. Such apparatus is well known and is schematically illustrated in FIG. 1A as ATT.

In the operation, the stuffing mass of coke is filled by the apparatus ATT under, about and over the columns of electrodes to be graphitized, CEG1, CEG2 in tank 15 and CEG1A, CEG2A in tank 15A, respectively. These columns are arranged between bus bar electrodes 74A, 74B and heads 79A, 79B, and between heads 79A, 79B and electrodes 75A, 75B, respectively. The furnace is then pushed on rails 14(A, B, C) by a suitable tractor which is coupled to hook GC (FIGS. 1A, 2B) near stationary framework 72. Hammer heads 84 of tie rods 82A, 82B and 83A, 83B are entered into corresponding slots 85 of uprights 76A of framework 12A in the furnace, the heads then being rotated 90° by means of drive levers 88. Levers 88 are parallel to heads 84, thus indicating the position of the latter when the furnace is anchored to stationary framework 72. Tie rods 82A, 82B and 83A, 83B are then put under tension by handwheel devices 81.

In this "locked" position of the furnace, contact bars 95 belonging to the contact assemblies of the movable furnace (which, as is self-evident, are two in number, i.e. one for any pair of bus bar electrodes 74A, 74B and 75A, 75B) are within slot 92 of respective stationary contact blocks 93. Contact blocks 93 and 94 are engaged by such bars so as to electrically connect the outer power supply system to bus bar assembly 96 of the movable furnace, thus supplying the graphitizing current to said pairs of electrodes (FIG. 10). Hydraulic assemblies 70A, 70B and 71A, 71B are then operated so that their enlarged heads 80 abuting against the outer surfaces of respective bus bar electrodes 74A, 74B or 75A, 75B exert a pressure thereon. These electrodes in turn press the adjoining ends EC of the electrodes to be graphitized forming columns CEG1, CEG2, and CEGA1, CEGA2, as apparent in FIGS. 2 and 2B. It should be appreciated that the function of tie rods 61A, 61B, 61C connecting both end frameworks 12A, 12B of the furnace is that of causing the pressure exerted by hydraulic assemblies 70A, 70B and 71A, 71B through the columns of electrodes to be graphitized and against common head 79A, 79B to be supported by stationary framework 73 and not by an outer support of end framework 12B.

Current is now passed through following path: bus bar electrodes 74A, 74B; electrode columns to be graphitized CEG1, CEG2; common head 79; electrode columns to be graphitized CEGA1, CEGA2; and bus bar electrodes 75A, 75B. Heating produced by the flow of current will cause electrodes forming columns to be graphitized, thus reaching temperatures in the order of 2500° to 3000° C. It should be noted that since hydraulic assemblies 70A, 70B and 71A, 71B are doubled, they can easily compensate the variations of length of the respective electrode columns due to different expansions. At the end of the graphitizing process, tie rods 82A, 82B and 83A, 83B are disengaged from end framework 12A so that electrical contact blocks 93, 94 are opened and the movable furnace is moved away from the stationary framework and brought elsewhere to carry out the cooling step. This allows pressing assemblies 70 and 71 and electrical contact systems 90 to carry out the graphitizing of electrodes contained in another movable furnace.

Because in a graphitizing process the time involved in the process is about only a quarter of the total time, the remaining three quarter of time involving the cooling, filling and discharging steps, it should be understood that the invention allows the productivity of the expensive pressing assemblies and power supply systems to be quadruplicate.

We claim:

1. Improved apparatus for graphitizing by Joule effect elongated pieces of amorphous carbon which are axially aligned head by head and are supported, enveloped and covered by a stuffing mass of thermally insulating granular material, said apparatus comprising:
   a stationary installation including at least two pressing means adapted to exert an elastic thrust;
   first mechanical anchor means associated with the stationary installation;
   first electrical contact means for supplying graphitizing current;
   means adapted to fill, arrange and remove said thermally insulating stuffing mass;
   an elongated graphitizing assembly movable on wheels toward and away from said stationary installation and including first and second end frameworks, said elongated graphitizing assembly adapted to contain the pieces to be graphitized in two side by side tanks provided at one end with at least two bus bar electrodes slideable in the axial direction of said pieces of carbon;
   second mechanical anchor means associated with the graphitizing assembly to said engage the first anchor means of the stationary installation to secure the movable graphitizing assembly to the stationary installation;
   second electrical contact mean associated with the graphitizing assembly adapted to engage said first electrical contact means of said stationary installation, receive the graphitizing current and supply it to said slideable bus bar electrodes; and
   a bus bar head at the end of both tanks opposite the bus bar electrodes,
   the apparatus being arranged so that, once the pieces to be graphitized are placed with their stuffing mass in each tank between said slideable bus bar electrodes and said bus bar head and the graphitizing assembly is mechanically and electrically connected to said stationary installation, said pressing means are in a position to each act on one slideable bus bar electrode so that the bus bar electrodes can tighten to one another said carbon pieces to be graphitized.

2. The improved apparatus of claim 1, wherein said stationary installation consists of an assembly of reinforced concrete.

3. The improved apparatus of claim 1, wherein said two pressing means adapted to exert an elastic thrust comprise a pair of hydraulic cylinder and piston assemblies.

4. The improved apparatus of claim 1, wherein said first anchor means comprises four tie rods each provided with a T-shaped head at an end projecting from the stationary installation and with tensile stress means and a drive lever parallel to the axis of said T-shaped head at an end connected to said stationary installation.

5. The improved apparatus of claim 1, wherein said first electrical contact means is formed of an elongated bar having a U-shaped groove directed outwards and a set of contact blocks movable from a closed position inside said groove to an open position in which they project outwards from said groove.

6. The improved apparatus of claim 1, wherein said means adapted to fill, arranged and remove said stuffing granular mass consists of a pneumatic assembly carried by a bridge crane and provided with at least a tank for receiving the stuffing mass and telescopic pipes for drawing and discharging the stuffing mass.

7. The improved apparatus of claim 1, wherein said movable graphitizing assembly further includes fan means for conveying a cooling current under said tanks and water circulation cooling means for cooling said slideable bus bar electrodes and said bus bar head.

8. The improved apparatus of claim 1, wherein said second anchor means comprises four elongated lots provided in an end framework.

9. The improved apparatus of claim 1, including two second electrical contact means each formed of an elongated bar.

10. The improved apparatus of claim 1, wherein each of said side by side tanks are arranged on a common framework consisting of a steel cage construction forming side by side frames adapted to receive firebricks forming together a continuous wall of the tanks.

11. The improved apparatus of claim 10, wherein said cage construction consists of several aligned sectors, each of them mechanically separated from the adjoining sector, and having firebricks covering the distance of separation between adjoining sectors, and wherein the mechanical and electrical continuity of said framework is interrupted by mechanical joints electrically insulated in both a longitudinal and axial direction.

12. The improved apparatus of claim 1, wherein said end frameworks are connected by several tie rods, the mechanical and electrical continuity of each tie rod being interrupted by electrically insulated joints.

* * * * *